United States Patent

[11] 3,577,177

[72] Inventor Clarence Wilson Hewlett, Jr.
Hampton, N.H.

[21] Appl. No. 836,816
[22] Filed June 26, 1969
[45] Patented May 4, 1971
[73] Assignee General Electric Company

[54] ZERO-CROSSING SILICON CONTROLLED RECTIFIER CONTROL SYSTEM
12 Claims, 4 Drawing Figs.

[52] U.S. Cl. ........................................ 323/18, 323/22, 323/24, 323/38
[51] Int. Cl. ........................................ G05f 1/44
[50] Field of Search ........................................ 307/133; 323/16, 109, 19, 22 (SCR), 24, 38

[56] References Cited
UNITED STATES PATENTS

| | | | |
|---|---|---|---|
| 3,283,179 | 11/1966 | Carlisle et al. | 307/133 |
| 3,373,290 | 3/1968 | Baker | 307/133 |
| 3,444,456 | 5/1969 | Codichini | 307/133X |

*Primary Examiner*—William M. Shoop, Jr.
*Assistant Examiner*—A. D. Pellinen
*Attorneys*—Frank L. Neuhauser, Oscar B. Wadell, William S. Wolfe, Gerald R. Woods and Joseph B. Forman

ABSTRACT: A zero-crossing silicon controlled rectifier control system for single-phase, full-wave and three-phase operation. An error signal representing the difference between desired and actual load values in integrated to control a first switch constituted by complementary transistors. A second switch, in series with a pulse generator and the first switch, is conductive during portions of alternate half cycles. Concurrent conduction by both switches energizes the pulse generator which causes a pulse to be generated on the energization. This turns on a first silicon controlled rectifier at the beginning with the positive-going zero crossing. A second silicon controlled rectifier controlled by a trigger circuit conducts during the next half cycle in response to load energization.

INVENTOR
CLARENCE W. HEWLETT, JR.

BY George A. Herbster
ATTORNEY

ZERO-CROSSING SILICON CONTROLLED RECTIFIER CONTROL SYSTEM

BACKGROUND OF THE INVENTION

This invention generally relates to the control of alternating current power to a load and more specifically to a control system for actuating silicon controlled rectifiers.

Many diverse types of power control have been used in the prior art which are especially adapted for industrial processes. Before the advent of silicon controlled rectifiers (hereinafter SCR's), these included motor-driven potentiometers, magnetic amplifiers and other diverse electrical and electromechanical elements. Within the last decade, the use of SCR's for controlling power has gained widespread acceptance especially as the power rating s of these devices have increased. Many SCR control systems have evolved, and these have been divided into two basic categories: phase control and zero-crossing control systems.

The various zero-crossing control systems of the prior art have been designed for a wide range of commercial applications. When these controls are analyzed for industrial process control applications, however, they must meet certain stringent requirements. When the system is controlled, it must be stable but react to commanded process changes rapidly. For example, certain prior art systems determined the average power to the load over a long time period and used multiple cycles for control. In furnace and other applications this caused process hunting and delayed response to commanded process changes. Such systems must react quickly and must also be reliable. At the power levels encountered, a nonreliable system can cause excessive direct current which can damage transformer s and other elements. Complex wiring of the control system into the total system can result in short circuits with attendant poor reliability. Finally, it is necessary to assure that the system responds linearly to commanded changes notwithstanding line voltage variations.

When the prior art circuits are analyzed, it is found that they do not generally meet all these criteria. Therefore, it is an object of the invention to provide a zero-crossing silicon controlled rectifier system which meets all the above criteria.

Another object of this invention is to provide a zero-crossing silicon controlled rectifier system which provides linear operation over a wide range of line voltage variations.

Another object of this invention is to provide a zero-crossing silicon controlled rectifier system which is readily adaptable for single-phase, full-wave and three-phase operation.

Still yet another object of this invention is to provide a zero-crossing silicon controlled rectifier system which operates on a cycle-by-cycle decision mode.

SUMMARY

The above and further objects of this invention are achieved by comparing a command signal against a reference signal during each cycle from the source. If the command signal and reference signal reach a predetermined relationship, a pulse generator signal reach a predetermined relationship, a pulse generator is energized during a portion of that cycle. At the end of the cycle, a pulse is coupled to the first SCR in a single phase system and SCR's in a three-phase system are fired in response to detecting energization of the load.

This invention is pointed out with particularity in the appended claims. The above and further appreciated by referring to the following detailed description taken in conjunction with the accompanying drawings.

DESCRIPTION OF ILLUSTRATIVE EMBODIMENTS

In the following discussion, like numerals refer to like elements throughout.

Figure 1:
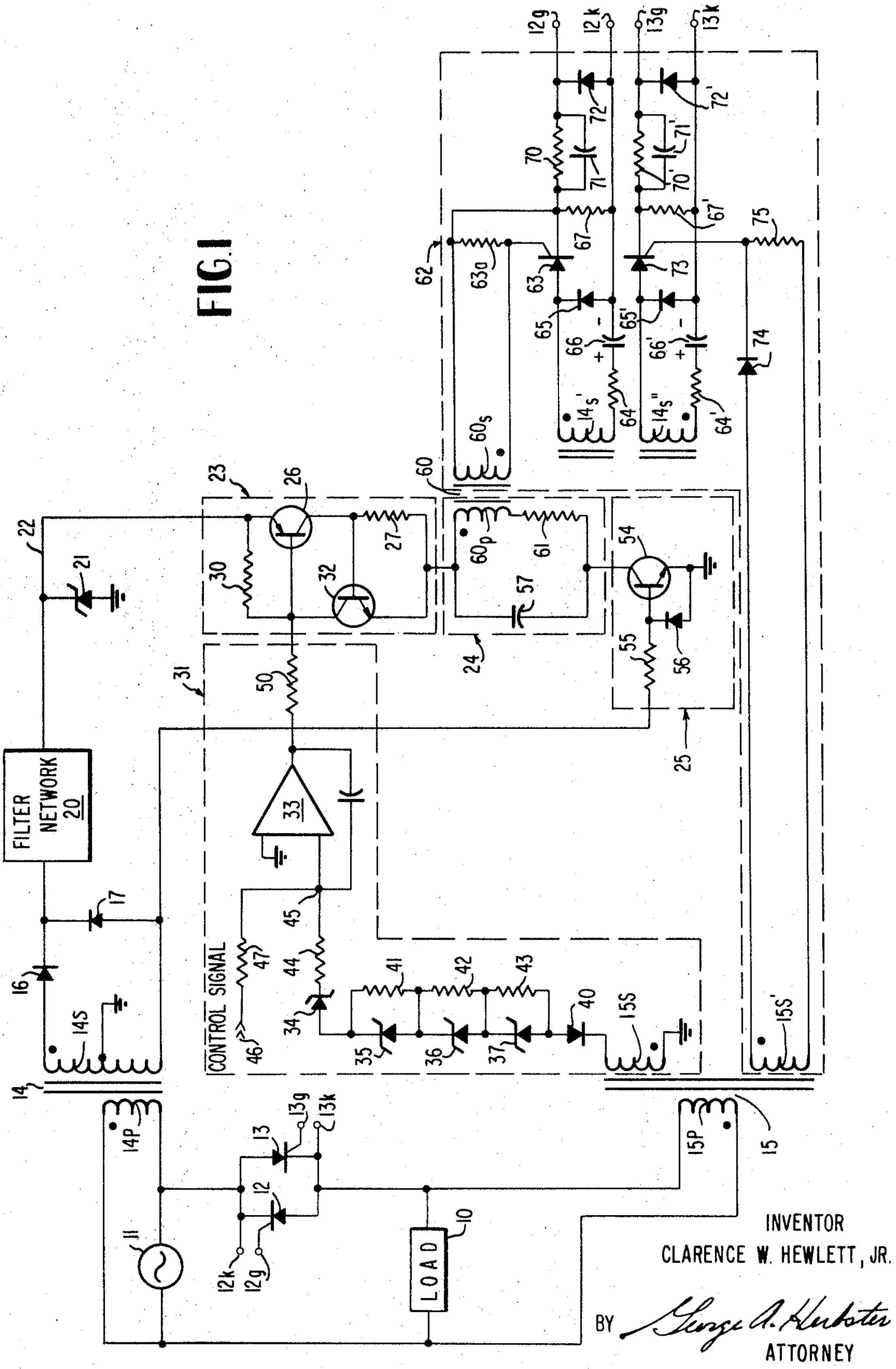
FIG. 1 is a schematic of a zero-crossing silicon controlled rectifier system adapted for use in a single-phase, full-wave network.

FIG. 1 illustrates an electrical load 10 which is coupled to a single-phase alternating current source 11 by a first main SCR 12 and a second main SCR 13. The first and second main SCR's 12 and 13 are oppositely poled and paralleled in a back-to-back configuration so they conduct on alternate half cycles when a gate pulse is applied to the proper electrodes. Terminals **12*g* and 12*k* are connected to the gate and cathode electrodes of SCR 12 respectively. Terminals 13*g* and 13*k* are connected to like electrodes on the SCR 13**.

A source transformer 14 has its primary **14*p* connected across the single phase alternating current source 11 and is poled as shown in FIG. 1. A load transformer 15 has its primary 15*p* connected across the electrical load 10 and is poled similarly to the source transformer 14. In combination, the source transformer 14 and load transformer 15 serve to couple signals representing the load and source voltages to the remainder of the control circuit shown in FIG. 1 to thereby isolate the control system from the AC source 11 and load 10** and minimize problems of incorrect field wiring.

The secondary **14*s* of the source transformer 14 is center-tapped and is coupled through diodes 16 and 17 and a filter network 20 to a zener diode 21 to generate a regulated DC voltage on a positive bus 22**.

The positive bus 22 is connected to a first switching means 23 which is in series with a pulse generator 24 and second switching means 25. The first switching means 23 includes a PNP transistor 26 and a resistor 27 in series. Base-emitter bias is supplied by a resistor 30. The base electrode of the PNP transistor 26 is coupled to a command signal generating means 31 to be described hereinafter. An NPN transistor 32 has its base and collector electrodes connected to the collector and base electrodes respectively of the PNP transistor 26. The resistor 27 is coupled between the base and emitter electrodes of the transistor 32 to thereby provide base-emitter electrodes of the transistor 32 to thereby provide base-emitter bias. First switching means 23 acts as a complementary silicon controlled rectifier; that is, if the command signal generating means 31 drives the base of the PNP transistor 26 negative and turns on the switching means 23, subsequent signals to the base electrode have no effect. External circuit parameters must cause the current to drop below a sustaining value. An SCR is not used because the controlling signal would be developed between the anode and gate electrodes. Functionally, however, the first switching means 23 is an equivalent to a complementary SCR.

There are diverse circuits available for producing a command signal to control the first switching means 23. The command signal generating means 31 shown in FIG. 1 is particularly well adapted to accomplish the various objects of this invention. In accordance with the schematic, a secondary **15*s* of the load transformer 15 is coupled to an integrating amplifier 33 by means of a voltage squaring feedback network comprising zener diodes 34, 35, 36 and 37. These zener diodes are coupled to the transformer secondary 15*s* by a diode 40 poled to conduct only during positive half cycles of load voltages. Each of the zener diodes 35, 36 and 37 has a resistor 41, 42 and 43 individually connected and parallel therewith. Zener diode 34 is connected to one input of the integrating amplifier 33 by means of a resistor 44. Proper selection of the zener diodes 34 through 37 and the resistors 41 through 43 cause a signal to be applied to a summing junction 45** which varies in accordance with the square of the load voltage. More detailed information regarding the operation of this circuit can be obtained by referring to Ser. No. 836,718 filed concurrently herewith and assigned to the same assignee as the present invention.

Figure 2:
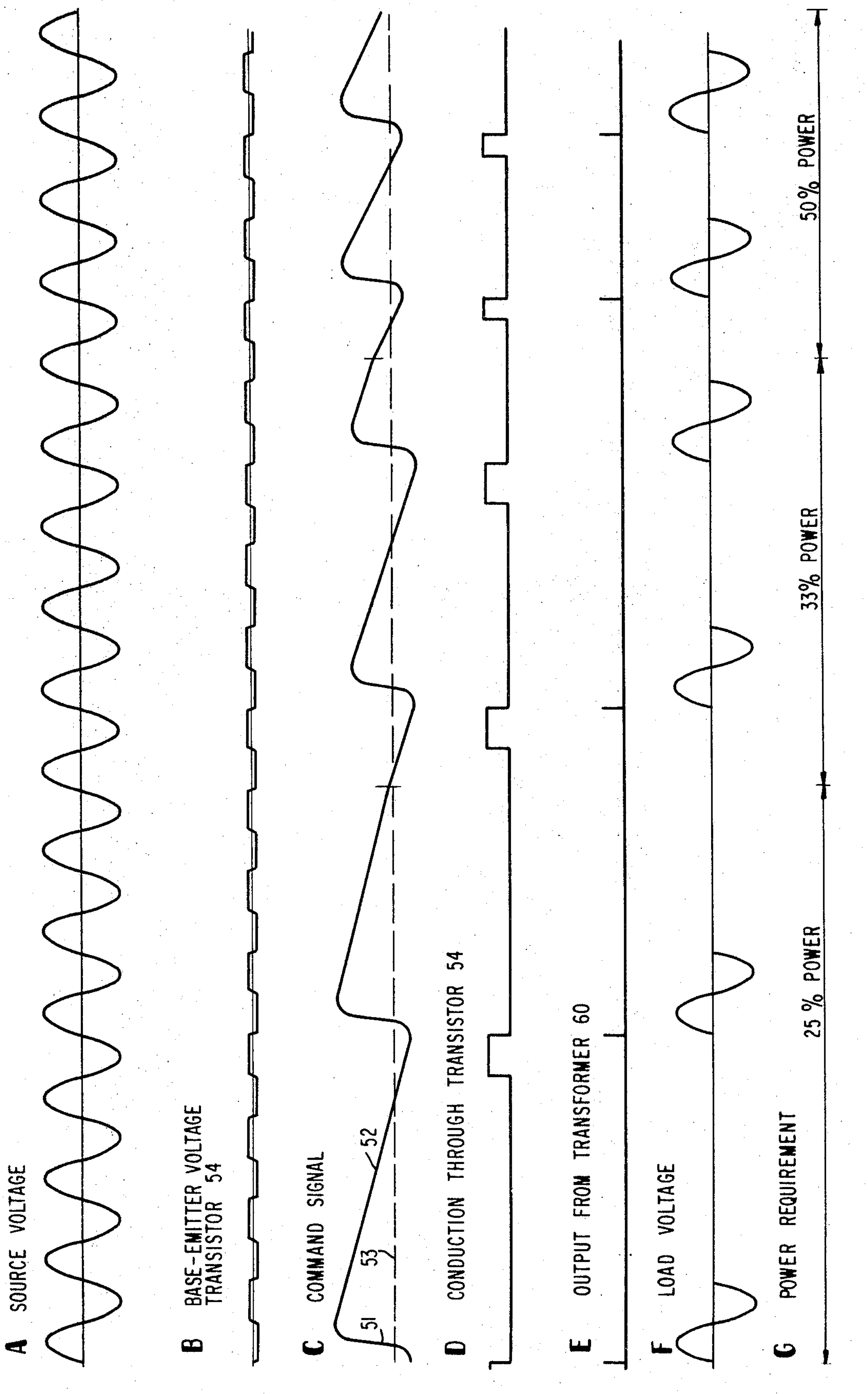
FIG. 2 is a graphical analysis useful for an understanding of the operation of the system shown in shown in FIG. 1.

If a control signal applied to a terminal 46 is coupled to the summing junction 45 by a resistor 47, the input to the integrating amplifier 33 represents an error between a desired load level and an actual load level. As the control signal applied at the terminal 46 is constant for a given load factor, the output from the integrating amplifier 33, which is coupled to the first switching means 23 through a resistor 50 appears as shown in FIG. 2, GRAPH C. As shown, the control signal is set initially to energize the electrical load at 25 percent power. Further, it is assumed that conduction of the first cycle of source voltage shown in GRAPH A should be made to the electrical load 10. During the first half cycle, therefore, the integrating amplifier 33 sees the combination of the negative, control signal and the positive load power signal from the feedback network and integrates it as shown by a portion 51 of the curve in GRAPH C. At the end of the positive half cycle, the feedback network stopes generating a signal. The remaining, constant negative voltage at integrating amplifier input generates a ramp portion 52. This ramp continues until it falls below the dotted line 53, which represents the signal level which biases the first switching means 23 for conduction.

The second switching means 25 comprises an NPN transistor 54 having its collector connected to the pulse generating means 24, its emitter grounded and its base coupled to the transformer secondary 14s through a resistor 55. A diode 56 is poled to conduct form the emitter to the base. As will become more evident hereinafter, FIG. 1 illustrates several ground points which are representative of a common bus. In accordance with this invention, this common bus is not connected to power ground to assure isolation of the control system.

The operation of the second switching means 25 can be more clearly understood by reference to FIGS. 1 and 2 together. GRAPH A in FIG. 2 shows a source voltage applied to the load. In accordance with the poling of the transformer 14, the base-emitter bias on the NPN transistor 54 will tend to follow a full-wave signal which is 180° out of phase with the source voltage as shown in GRAPH B. However, the base-emitter diode junction of the transistor 54 and the diode 56 clamp the base-emitter bias to about one-half volt. Therefore, GRAPH B illustrates the base-emitter voltage of the transistor 54 as being a series of steps. The slope between the two states is shown as an exaggerated slope along the normal plot of the alternating current voltage. In actual practice, the total rise or decay time would be less than 5°. Hence, the base-emitter voltage actually approaches a step function. If the first switching means 23 is biased for conduction, then the pulse generating means 24 is energized until substantially the end of that negative half cycle whereupon the NPN transistor 54 becomes nonconductive.

Now referring to GRAPH D of FIG. 2, the first negative half cycle of source voltage which occurs after the command signal calls for the next cycle causes the transistor 54 to conduct until the end of the negative half cycle when the transistor 54 is rapidly turned off. While both the first and second switching means 23 and 25 are conductive, current flows through the pulse generating means 24 which includes a capacitor 57, the primary of a transformer 60 and a resistor 61. The relative impedances of each element cause the capacitor 57 to be charged rapidly and for a steady state DC current to energize the transformer primary **60*p*. During initial energization of pulse generator 24, there will be an energy transfer across the transformer 60, but the main SCR 12 is reverse biased. When the second switching means 25 is rendered nonconductive shortly before the positive going zero crossing of the source voltage shown in GRAPH A, the energy in the pulse generating means 24 is dissipated across the transformer 60 to a trigger circuit 62** as the pulse shown in GRAPH E.

There are two reasons for not using the pulse to directly fire a main SCR. First, the pulse energy available from the transformer 60 is generally not sufficient to fire an SCR in the power ranges normally encountered in industrial applications. Secondly, this pulse is generated shortly before the positive going zero crossing so it could not turn on the main SCR reliably. Therefore it is desireable to utilize an intermediate trigger circuit 62. The trigger circuit 62 has four terminals which are directly connected to the control electrodes on the main SCR's and are designated by the same numerals **12*g*, 12*k*, 13*g* and 13*k*. In accordance with another aspect of this invention, the pulse coupled to the trigger circuit 62 only controls the firing of the first main SCR 12. Firing of main SCR 13** is controlled by the trigger circuit in response to load load energization to minimize the direct current content.

The transformer secondary **60*s* is connected to the cathode and gate electrodes of a first pilot SCR 63, the pulse developing a voltage across a resistor 63*a*. The SCR 63 is energized by means of a secondary 14*s*' of the source transformer 14 poled as shown in FIG. 1. During the negative half cycle, current flows through a resistor 64 and a diode 65 to charge a capacitor 66. As the voltage recedes from a negative maximum, the capacitor is charged as shown and retains forward bias on the SCR 63, as the capacitor 66 is also coupled to the cathode electrode of the SCR 63 through a resistor 67. Therefore, when the pulse is generated by the pulse generating means 24, it turns on SCR 63 which then causes the capacitor 66 to discharge through the remainder of the negative half cycle and until the voltage from the positive half cycle overtakes it to thereby generate a latching signal coupled through a parallel resistor 70 and capacitor 71 to the terminal 12*g*. A diode 72 connected across the terminals 12*g* and 12*k* limits reverse voltages. The capacitor 66, the resistor 64 and the resistor 67** therefore permit the pulse to occur before the positive half cycle to generate true zero-crossing control.

A somewhat similar circuit controls the firing of the main SCR 13 and so like numerals are used to designate like components. In this case, however, a second pilot SCR 73 is coupled to a secondary **15*s*' on the load transformer 15. The transformer secondary 15*s*' and a diode 74 are poled to conduct during the positive half cycle of voltage on the load 10. This generates a voltage across a resistor 75 which is coupled to the second pilot SCR 73. Therefore, if the main SCR 12 is fired by the trigger circuit 62, the secondary 15*s*' senses load energization during the positive half cycle and causes the trigger circuit 62 to turn on the main SCR 13 during the next half cycle. As a result, the one pulse from the output of transformer 60 shown in GRAPH E of FIG. 2 causes a complete cycle of load voltage to appear across the load 10 as shown in GRAPH F of FIG 2 causes a complete cycle of load voltage to appear across the load 10** as shown in graph F to minimize the direct current content in the load.

FIG. 2 initially shows a 25 percent power requirement which causes the command signal to decay at a rate which maintains the first switching means 23 nonconductive until the third succeeding cycle. During that time, the first switching means 23 is biased for conduction. As the source voltage goes negative, the pulse generating means 24 is energized. Subsequently, at the end of the negative half cycle, a pulse is coupled to the trigger means 62 to cause the fourth succeeding full cycle of source voltage to be applied to the load.

If the load requirement is varied, the slope of the ramp 52 changes becoming steeper with increased load requirements. The vertical height of the combined integrated output 51 decreases as the requirement increases. This causes the command signal to turn on the first switching means at an earlier time with the result that fewer cycles are blocked and the power increases as shown in FIG. 2 which illustrates a period of 33 percent power and 50 percent power. In accordance with one object of this invention, one cycle is conducted to the load and the next cycle is not conducted to the load at 50 percent power. This result is due to the feedback network which only operates during a first half cycle. If the feedback network were operated on both half cycles, two cycles would be conducted and then two cycles would be dropped at 50 percent power.

In summary, the single-phase, full-wave zero-crossing is obtained by using tow switching means which are individually controlled by two circuit parameters. The first switching means responds to the integral of an error signal which determines the difference between actual and desired load factors. The second switching means is synchronized with the negative half cycle from the source. Decisions on whether the load should be energized during the next succeeding cycle are thereby limited to a time including that negative half cycle. If the command signal should turn on the first switching means 23 while the second switching means 25 is biased for conduction, it is still possible for the main SCR's 12 and 13 to fire providing sufficient time time exists for the transformer 60 to be charged. If insufficient time exists, then the circuit if fired on the next succeeding cycle. Such a situation may exist, for example, with a 51 percent power requirement. Further, in accordance with this invention, a pulse is generated shortly before the completion of the decision half cycle and trigger circuit means 62 shown in FIG. 1 responds to that pulse to turn on one main SCR, the second main SCR being turned on in a response to energization of the load.

Figure 3:
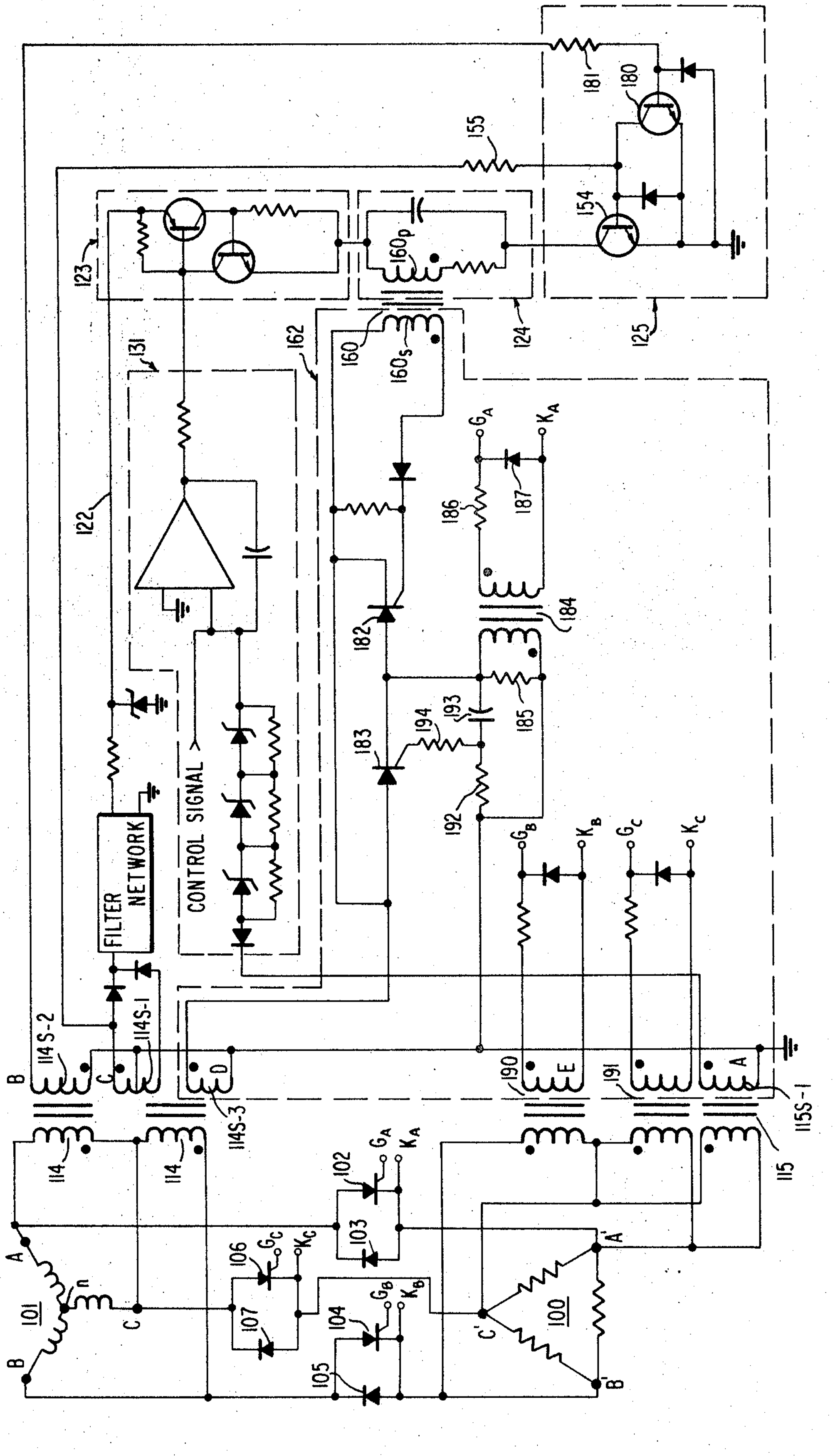
FIG. 3 is a schematic of a zero-crossing silicon controlled rectifier system adapted for use in a three-phase operation.
Figure 4:
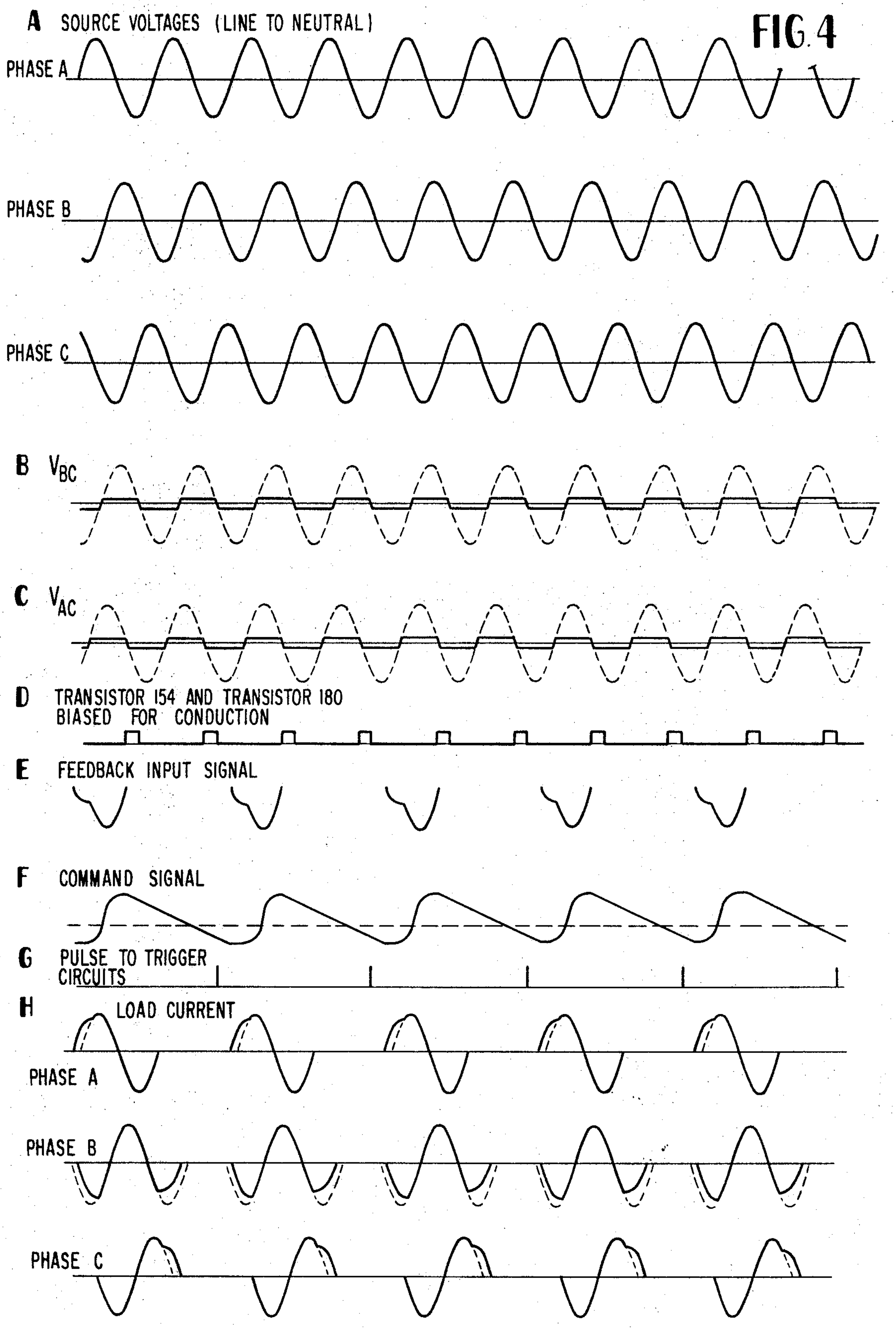
FIG. 4 is a graphical analysis useful for an understanding of the system shown in FIG. 3.

As shown in FIGS. 3 and 4, this circuit is also adapted for controlling the energization of a three-phase resistive load 100 from a three-phase source 101. Each line is coupled to the load by a main SCR and diode switch SCR's 102, 104 and 106 and diodes 103, 105 and 107 each respectively coupling the phases A, B and C to the electrical load 100. Voltage in a given phase is only controlled by one SCR in the forward direction as the diode merely serves as a return path when one or both of the other SCR's are turned on. Source transformers 114 and load transformers 115, each having a plurality of primaries and secondaries couple various signals from the alternating current source 101 and the electrical load 100 to the control system. One phase of the alternating current source is coupled through a primary to a secondary **114*s*–1 to generate a regulated DC voltage on a positive bus 122. This voltage energizes a series circuit constituted by a first switching means 123 and a pulse generator 124, identical in structure and function to the first switching means and pulse generator 23 and 24 shown in FIG. 1, and a second switching circuit 125 which is similar in function but structurally modified from the switching circuit 25 shown in FIG. 1. A command signal generating means 131 is constructed as shown in FIG. 1 and is coupled to a secondary 115*s*–1 to be energized by a voltage $V_{C'A'}$ to develop a feedback signal which is proportional to the load and which is compared with a control signal in the command signal generating means 131 to produce an output which is coupled to the first switching means 123 as shown in GRAPHS C, E and F of FIG. 4. When the signal from the command signal generating means 131 differs from that on the positive bus 122, a first switching means 123** is biased to conduction.

Switching means 125 determines the period during which decisions to fire are made. The selected time period is dependent upon several considerations including the selection of the particular phase of the load voltage to generate the feedback signal. As shown in FIG. 4, GRAPH E, the feedback input signal has an irregularity at the beginning. However, this voltage, taken at terminals A′ and C′, also has an ending irregularity so the voltage is balanced and no direct current flows in the transformer 115. If another phase were used, a direct current component would energize the transformer 115. In accordance with the operation of a single-phase circuit, only one half wave is used for feedback. The first half wave is selected to complete the feedback integration to provide a maximum decision time span to make and implement a decision to fire As the positive going zero-crossing is convenient, it defines the beginning of a decision period and the switching means 125 is rendered conductive at this point.

As shown in FIG. 3, pulse generator 124 couples a pulse to a trigger circuit which is energized specifically by a transformer coupled to the B and C terminals. As will be described more fully hereinafter, it is necessary to fire the main SCR 102 30° ahead of the A-neutral voltage to obtain a true zero-crossing operation. If the entire system is to be a zero-crossing operative system, the trigger circuit 162 must be turned on 60° after the switching circuit 125 is rendered conductive. Where minute RFI and other problems associated with phase control circuits are not a serious problem, a different decision time could be selected by using a phase control circuit.

This 60° decision time span is defined by modifying the switching means 25 shown in FIG. 1. A first, NPN transistor 154 is coupled through a resistor 155 to the one input of the filter network and is biased on while the source voltage $V_{BC}$ is positive. Another NPN transistor 180 is coupled between the base and emitter electrodes of the transistor 154 and to a secondary **114*s*–2 through a resistor 181 to be energized by the voltage $V_{AC}$. The transistor 180 is, therefore, conductive until the voltage $V_{AC}$ goes through a negative zero-crossing which coincides with the positive zero-crossing of the load voltage $V_{CA}$. At that time, the voltage $V_{BC}$ is positive so that transistor 154** turns on and remains on until the voltage $V_{BC}$ goes through the negative zero crossing 60° later.

Assuming that a decision is made to fire the next cycle, a pulse from the pulse generating means 124 occurs as the transistor 154 turns off as was true in the system of FIG. 1. This pulse is then coupled to a transformer secondary **160*s* to energize a portion of the trigger circuit 162**.

The trigger circuit 162 includes a zero-crossing firing circuit. Two SCR's 182 and 183 are oppositely poled in parallel and are connected to a secondary **114*s*–3 which is energized by the voltage $V_{BC}$. As a pulse occurs at the negative zero crossing of the voltage $V_{BC}$ and as the pulse is sufficiently long to turn on the SCR 182, a conductive path is defined form the secondary 114*s*–3 through a resistor 185, the parallel primary of a transformer 184 and the SCR 182. Positive going half cycles are applied to the terminals $G_a$ and $K_a$ through a resistor 186 and a diode 187** which clips negative half cycles.

Therefore, the voltage $V_{BC}$ is, by virtue of the poling of transformer 184 positive when the SCR 102 is forward biased. When the SCR 102 is forward biased the first time, it is capable of being conductive about 30° before the effective A-neutral shown in FIG. 4, GRAPH A goes through the positive zero crossing. With the phase sequence shown, the voltage across the SCR 102 is a combination of the effective A-neutral and B-neutral voltages, the effective B-neutral voltage being applied to the cathode. An analysis of these curves shows that the SCR 102 is forward biased 30° before the positive zero crossing. If successive cycles are conducted to the load, the beginning irregularities do not exist. A similar beginning irregularity exists in phase B as shown in FIG. 4, GRAPH H. Phases B and C generate similar ending irregularities after the cycle from phase A has been completed. Ending irregularities only occur during the last cycle. Hence, the 50 percent load factor which is shown in FIG. 4 represents the worst irregularity condition and actually produces a 54 percent load energization. An analysis shows that the beginning and ending irregularities generate a 4 percent direct current content in phases A and C and 8 percent content in phase B. At other load factors, the percentages decrease reaching zero at 0 percent and 100 percent load. The effect of these irregularities can be compensated.

In the circuit of FIG. 1, only a first half cycle was controlled by the pulse, the subsequent half cycle being controlled in response to load energization. The same philosophy is used in the three-phase system shown in FIG. 4. A transformer 190 is coupled across terminals B′C′ of the load 100. The output is coupled to the terminals $G_bK_b$ which are coupled to the SCR 104. If SCR 102 fires, then transformer 190 will be biased to turn on the SCR 104 at the next positive zero-crossing of the effective B-neutral voltage. Similarly, a transformer 191 is connected across the terminals A′C′ and is energized by the load to turn on the SCR 106 at the positive zero-crossing of the effective C-neutral voltage.

If the SCR 182 shown in the trigger circuit 162 were the only SCR in the trigger circuit, it would be possible to saturate the transformer 184. This is avoided by the use of a zero-crossing circuit for the trigger circuit 162. During the half cycle when the SCR 182 conducts, a resistor 192 and a capacitor 193 are charged. At the negative zero-crossing, the voltage at the junction thereof is coupled to the gate of the SCR 183 by a resistor 194. Therefore, on the succeeding half cycle when the voltage $V_{BC}$ is positive, the SCR 183 is turned on at the positive zero-crossing and resets the transformer 184. In this manner, the circuit is reset after every pulse to assure proper operation of the trigger circuit 162.

In this discussion, it has been assumed that the load 100 is a three-phase resistive load, a common application for zero-crossing firing circuits. Further, it has been assumed that the load is balanced so that GRAPH H of FIG. 4 accurately represents the load current in each of the conductors connecting the three-phase source 101 to the load 100. At a 50 percent level, defined as a single-cycle-on, single-cycle-off for a single phase system is somewhat modified for three-phase operation. Using phase A as a reference, it denotes a full cycle of effective line-to-neutral voltage for phase A and the associated current to the load. However, depending upon the configuration of the circuit, and the load, these definitions may vary. However, it can be defined as a single cycle from the reference phase and the complementary conduction through the remaining phases.

In summary, a zero-crossing SCR control system constructed in accordance with this invention scans or samples the load power and generates a command signal which is analyzed during each cycle of operation to determine whether the next succeeding cycle from this source should be coupled to the load. The time in which this decision must be reached is defined by a second switching means which in conjunction with a first switching means, responsive to the load level, energizes a plus pulse generating means to cause a trigger circuit to fire the SCR and couple the next succeeding cycle to the load.

It will become obvious that various modifications and alterations in this circuit can be made without departing from the true spirit and scope of the appended claims. Different feedback and command signal generating means can be used. As indicated, other choices of trigger circuits can be made without detracting from the operation of the system in certain applications. Further, the switching means and pulse generating means may also be modified. Further modifications may occur in the way also be modified. Further modifications may occur in the way signals are coupled from the source and load to the control circuit, for in certain applications it may be necessary to use distinct transformers. In whatever form, it is intended in the appended claims to cover such modifications to the various circuits and circuit sections.

I claim:

1. A system for controlling the energization of an alternating current load by an alternating current source couple thereto by first and second main silicon controlled rectifiers and means for controlling main silicon controlled rectifier conduction comprising:

a. means for generating a command signal, b. rectifying means connected to said source for establishing a direct current source, c. first and second switching means and a pulse generating means forming a series current path between said direct current source and a system common terminal, said first switching means being connected to said command signal generating means to be conductive in the presence of a command signal, said second switching means being coupled to the source to be conductive during first half cycles from the source, said switching and pulse generating means coacting to generate a pulse at the end of the first half cycle when a command signal is present; and d. triggering means connected to said pulse generating means and main silicon controlled rectifiers for causing the the next succeeding full cycle from the source to energize the load.

2. A system as recited in claim 1 wherein said triggering means comprises a first trigger circuit coupled to said pulse generating means and the source for causing the first main silicon controlled rectifier to conduct for causing a second half cycle to energize the load when a command signal exists and a second trigger circuit couple to the source and the load and responsive to load energization by the second half cycle to cause the second silicon controlled rectifier to conduct the next succeeding half cycle.

3. A system as recited in claim 1 wherein the source generates a three-phase voltage and the load is a three-phase load coupled thereto by a back-to-back silicon controlled rectifier and diode in each phase, said trigger means comprising a first trigger circuit coupled to said pulse generating means and to the source for causing the first main silicon controlled rectifier in the first phase to conductive during the next succeeding phase cycle when the main silicon controlled rectifier is forward biased and second and third trigger circuits coupled to the load and individually to said second and third main silicon controlled rectifiers respectively and responsive to energization of the load to cause the said second and third main silicon controlled rectifiers to energize the load in sequence whereby the load is energized by a full three-phase cycle.

4. A system for controlling the energization of an alternating current load by an alternating current source coupled thereto by first and second main silicon controlled rectifiers and means for controlling main silicon controlled rectifier conduction comprising:

a. means for generating a command signal comprising feedback means coupled to the load for generating a signal which is variable in accordance with power to the load, means for generating a control signal which is variable in accordance with the desired power to the load and means responsive to the load power signal and control signal for generating an integral signal variable in accordance with the time integral of the difference thereof, the integral signal being the command signal;

b. first and second switching means and a pulse generating means in series, said first switching means being connected to said command signal generating means to be conductive in the presence of a command signal, said second switching means being coupled to the source to be conductive during first half cycles from the source, said switching and pulse generating means coacting to generate a pulse at the end of the first half cycle when a command signal is present, and triggering means connected to said pulse generating means and main silicon controlled rectifiers for causing the next succeeding full cycle from the source to energize the load.

5. A system as recited in claim 4 wherein said pulse generating means includes a direct current voltage source, wherein said first switching means includes a pair of complementary transistors in series with said voltage source and connected to said integrating means, said complementary transistors being biased to conduction by time inter integral signals of a given polarity.

6. A system as recited in claim 5 wherein said second switching means includes another transistor in series with said voltage source and coupled to the alternating current source to be biased for conduction during each half wave of the same polarity as the first half wave, said other transistor being turned off before the end of conductive half wave.

7. A system as recited in claim 6 wherein said pulse generator additionally comprises inductive and capacitive impedances in parallel, said inductive impedance being coupled to said triggering means to generate a pulse at the end of conductive half waves during which the first switching means is conductive when the other transistor in said second switching means is turned off.

8. A system as recited in claim 7 wherein said inductive impedance includes a transformer having primary and secondary windings said primary winding being in series with said first and second switching means and said secondary winding being connected to said trigger means.

9. A system as recited in claim 8 wherein said trigger means comprises a first pilot circuit including a first pilot silicon controlled rectifier coupled to said first main silicon controlled rectifier and means coupled to the source for biasing said first pilot silicon controlled rectifier for conduction and means connected to said pulse generating means transformer secondary, said first pilot silicon controlled rectifier being responsive to a pulse to turn on said first main silicon controlled rectifier and energize the load and a second pilot coupled to the load and responsive to load energization to turn on said second main silicon controlled rectifier.

10. A system as recited in claim 9 adapted for operation in a single phase full wave control system wherein said second pilot comprises a second pilot silicon controlled rectifier and means coupled to the source for biasing said second pilot silicon controlled rectifier for conduction and means adapted to be coupled to the load ro to generate a signal in response to load energization, said means being coupled to said second pilot silicon controlled rectifier.

11. A zero-crossing power control system for coupling an alternating current, single-phase, full-wave electrical load and source comprising:

a. first and second oppositely poled, parallel, main silicon controlled rectifiers,
b. command signal generating a means including
   i. means for generating a control signal variable in accordance with a desired average power to the load,
   ii. means for generating a feedback signal variable in accordance with an actual average power to the load during a first half cycle, and
   iii. means for integrating the sum of the control and feedback signals to thereby generate the command signal,
c. a direct current source,
d. a first switch responsive to predetermined values of said command signal including first and second complementary transistors coupled to said command signal generating means and said direct current source,
e. a pulse generator including a serially connected transformer primary and resistor and a capacitor in parallel therewith, said pulse generator being connected to said first switch,
f. a second switch coupling said pulse generator to said direct current source and being coupled to the source to be conductive during second half cycles, said transformer primary being energized when said first and second switches are conductive, and
g. a trigger circuit responsive to deenergization of said pulse generator to cause said first and second main silicon controlled rectifiers to fire sequentially including
   i. a first pilot circuit including a first pilot silicon controlled rectifier coupled to said first main silicon controlled rectifier and means coupled to the source for biasing said first pilot silicon controlled rectifier for conduction and means connected to said pulse generating means transformer for applying a signal to said first pilot silicon controlled rectifier to cause said first main silicon controlled rectifier to begin conduction at the next succeeding positive zero crossing, and
   ii. a second pilot circuit including a second pilot silicon controlled rectifier coupled to the second main silicon controlled rectifier, means coupled to the source for biasing said second pilot silicon controlled rectifier for conduction and means adapted to be coupled to the load to generate a signal in response to load energization to cause said second pilot silicon controlled rectifier to be conductive to thereby cause the next succeeding half cycle to be coupled to the load through the second main silicon controlled rectifier.

12. A zero crossing power controlled system for coupling an alternating current, three-phase electrical load and source comprising:

a. a plurality of main firing circuits, each firing circuit including a main silicon controlled rectifier and an oppositely poled diode in parallel and being in series with one phase of the source and load,
b. command signal generating means including means for generating a control signal variable in accordance with the desired average power to the load, means for generating a feedback signal variable in accordance with an actual average power to the load during a first half cycle and means for integrating the sum of the control and feedback signals to thereby generate the command signal,
c. a direct current source,
d. a first switch responsive to predetermined values of said command signal including first and second complementary transistors coupled to said command signal generating means and said direct current source,
e. a pulse generator including a serially connected transformer primary and resistor and a capacitor in parallel therewith, said pulse generator being connected to said first switch,
f. a second switch coupling said pulse generator to said direct current source and being coupled to the source to be conductive to define a decision time, said second switch including third and fourth transistors coupled to be energized by different phases of the source, said fourth transistor controlling the conduction of said third transistor, said third transistor connecting said pulse generator to said direct current source, and
g. a trigger circuit responsive to deenergization of said pulse generator to cause said plurality of main silicon controlled rectifiers to fire sequentially including
   i. a first pilot circuit including first and second pilot silicon controlled rectifiers oppositely poled and connected in parallel, said pilot silicon controlled rectifiers being connected in series with a transformer load, said first pilot silicon controlled rectifier being rendered conductive to energize said transformer and said second pilot silicon controlled rectifier being energized during the next half cycle, said transformer and said pilot circuit coupling the voltage to said first main silicon controlled rectifier,
   ii. a second pilot circuit coupled to said load and said second main silicon controlled rectifier to bias said second main silicon controlled rectifier for firing, and
   iii. a third control circuit coupled to said load and said third main silicon controlled rectifier to bias said third main silicon controlled rectifier for firing in response to load energization whereby a pulse from said pulse generator causes said main silicon controlled rectifiers to be fired in sequence.

UNITED STATES PATENT OFFICE
CERTIFICATE OF CORRECTION

Patent No. 3,577,177 Dated May 4, 1971

Inventor(s) Clarence W. Hewlett, Jr.

It is certified that error appears in the above-identified patent and that said Letters Patent are hereby corrected as shown below:

In the Abstract, line 4, "in" should be -- is --. Column 1, line 60, delete "generator signal reach a predetermined relationship, a pulse"; line 62, after "SCR", insert -- to fire it at positive-going zero crossing. The remaining SCR --; line 66, after "further", insert -- objects and advantages of this invention can be further --. Column 3, line 29, "form" should be -- from --. Column 4, line 12, delete "load"(second occurrence); lines 48 and 49, after "GRAPH F", delete "of FIG 2 causes a complete cycle of load voltage to appear across the load 10 as shown in graph F". Column 5, line 14, after "circuit", delete "if" and insert -- is --. Column 6, line 30, "form" should be -- from --. Column 7, line 33, delete "plus"; line 43, delete "occur in the way also be modified. Further modifications may"; line 46, after "transformers", insert -- while in other applications, it may be possible to combine transformers --; line 52 (Claim 1), "couple" should be -- coupled --. Column 8, line 4, "couple" should be -- coupled --; line 56, "to" should be -- for --; delete "inter". Column 9, line 14, after "rectifier", insert -- coupled to said second main silicon controlled rectifier --.

Signed and sealed this 9th day of May 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334